United States Patent
Tsuchida

(10) Patent No.: US 8,466,363 B2
(45) Date of Patent: Jun. 18, 2013

(54) SOUND GENERATION PROCESSING APPARATUS, SOUND GENERATION PROCESSING METHOD AND A TANGIBLE RECORDING MEDIUM

(75) Inventor: Yoshinori Tsuchida, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 222 days.

(21) Appl. No.: 12/951,353

(22) Filed: Nov. 22, 2010

(65) Prior Publication Data

US 2011/0138991 A1    Jun. 16, 2011

(30) Foreign Application Priority Data

Dec. 11, 2009  (JP) ................ 2009-282114

(51) Int. Cl.
*G10H 7/00*    (2006.01)

(52) U.S. Cl.
USPC .................................. 84/602; 381/1

(58) Field of Classification Search
USPC .................................. 84/602; 381/1
See application file for complete search history.

(56) References Cited

U.S. PATENT DOCUMENTS

| | | | |
|---|---|---|---|
| 7,027,600 | B1 | 4/2006 | Kaji et al. |
| 7,338,373 | B2 | 3/2008 | Kawamura |
| 2004/0110561 | A1 | 6/2004 | Kawamura |
| 2009/0137314 | A1 | 5/2009 | Nakayama |
| 2010/0260355 | A1 | 10/2010 | Muraoka et al. |

FOREIGN PATENT DOCUMENTS

| | | |
|---|---|---|
| EP | 1994969 | 11/2008 |
| JP | 2000-267675 | 9/2000 |
| JP | 2002-085831 | 3/2002 |
| JP | 2004-195210 | 7/2004 |
| JP | 2007-259888 | 10/2007 |
| JP | 2009-246600 | 10/2009 |

OTHER PUBLICATIONS

Extended European Search Report from E.P.O. in EP Application No. 10193956, mail date is Dec. 22, 2011.
Japan Office action in JP 2009-282114, dated Oct. 25, 2011, along with an English language translation thereof.
Japanese Office Action issued in Japanese Patent Application No. 2009-282114, dated Mar. 13, 2012, along with an English language translation thereof.

*Primary Examiner* — Jeffrey Donels
(74) *Attorney, Agent, or Firm* — Greenblum & Bernstein, P.L.C.

(57) ABSTRACT

The present invention improves a processing speed by combining simple sound source species with a basic configuration and processing the combination as a single sound source when sound sources and sound fields are placed and formed in a three-dimensional virtual space. For example, a sound source object with a complicated shape, such as a river, includes first sound source objects with shapes of rectangular parallelepipeds and second sound source objects with shapes of triangular prisms. The first and second sound source objects have the same identification numbers and have sound data related to a sound of the sound source object with the complicated shape, such as a babbling sound of the river. When one of the first and second sound source objects is the closest to a player character, sound generation processing is executed based on that sound source object.

20 Claims, 4 Drawing Sheets

| | IDENTIFICATION NUMBER (32) | SOUND DATA (33) | REFERENCE SOUND VOLUME (34) |
|---|---|---|---|
| 30 | 00001 | BABBLING SOUND OF RIVER | $V_{0-2}$ |
| | 00002 | SOUND OF WAVE | $V_{0-2}$ |
| | 00003 | SOUND OF BUSTLE | $V_{0-3}$ |
| | ⋮ | ⋮ | ⋮ |

| IDENTIFICATION NUMBER | POSITION INFORMATION |
|---|---|
| 00001 | $X_A, Y_A, Z_A$ |
| 00018 | $X_B, Y_B, Z_B$ |
| 00004 | $X_C, Y_C, Z_C$ |
| ⋮ | ⋮ |

SOUND GENERATION PROCESSING APPARATUS, SOUND GENERATION PROCESSING METHOD AND A TANGIBLE RECORDING MEDIUM

CROSS REFERENCE TO RELATED APPLICATION

The present disclosure relates to subject matter contained in Japanese Patent Application No. 2009-282114, field on Dec. 11, 2009, the disclosure of which is expressly incorporated herein by reference in its entirety.

BACKGROUND OF THE INVENTION

1. Field of the Invention

The present invention relates to a sound generation processing apparatus that executes sound generation processing, based on sound sources placed in a three-dimensional virtual space.

2. Description of the Related Art

Conventionally, various role playing games or action games are provided in which a player assumes the identity of a player character of a virtual world, resolves problems while moving the player character on a field in a virtual space, and progresses a game. In these games, in a case where the player character moves on the field in the virtual space and sound sources such as rivers or waterfalls exist, babbling sounds of the rivers or sounds of water falling into basins of the waterfalls are generated to raise a realistic sensation.

However, in order to place sound sources with complicated shapes in a virtual space, a high-level tool function that generates a three-dimensional model and an analysis function of a game apparatus that corresponds to the high-level tool function are required. For this reason, a work time and cost of a programmer increase and a slowdown in the processing speed of the game apparatus is caused.

Meanwhile, there is disclosed an acoustic signal processing apparatus in which objects are placed in a three-dimensional virtual space, a sound generated from the predetermined sound generation position is subject to an acoustic simulation at the predetermined hearing position to generate an acoustic signal, and a sound field space becoming a subject of the acoustic simulation is configured by combining the sound field space with space objects (see, for example, Japanese Patent Application Laid-Open No. 2000-267675).

SUMMARY OF THE INVENTION

However, in Japanese Patent Application Laid-Open No. 2000-267675, the sound field space becoming the subject of the acoustic simulation is configured by combining the sound field space with the space objects, and a sound source object becoming a subject of sound generation processing is not combined. Accordingly, it is an object of the present invention to improve a processing speed by combining simple sound source species with the basic configuration and processing the combination as a single sound source, instead of setting a complicated shape along the configuration of the land or the area as one sound source, when sound sources and sound fields are placed and formed in a three-dimensional virtual space.

According to a first embodiment of the present invention, there is provided a sound generation processing apparatus that executes sound generation processing based on sound sources placed in a virtual space, the sound sources being a plurality of sound sources with simple shapes and having the same identifiers or different identifiers. The sound generation processing apparatus includes a sound source information storage that stores sound data in associate with the identifiers of the sound sources. The sound generation processing apparatus also includes a sound source specifier that specifies the sound source having a higher priority among the sound sources having the same identifiers as sound source of sound generation subject, based on a predetermined criterion. The sound generation processing apparatus also includes a sound generation processor that executes sound generation processing in accordance with the sound data corresponding to the sound source of sound generation subject specified by the sound source specifier.

The sound generation processing apparatus according to the present invention is mainly suitable for a game apparatus. As the simple shape, any shape that is selected from shapes of a cube, a rectangular parallelepiped, a cylinder, a circular cone, a prismatic column, a pyramid, a partial sphere, and a sphere is used. The sound source with the complicated shape according to the configuration of the land or the area in the virtual space can be freely designed by placing the plural sound sources with the simple shapes. Since the simple shapes are handled without handling the complicated shape in the program processing, it is not necessary to perform a complicated calculation of the output sound volume and the localization of sound based on the sound source with the complicated shape, and the processing load can be reduced. Since the sound field can be configured by the combination of the basic simple shapes, a sound designer can intuitively and easily generate a sound field area.

Preferably, the sound generation processing apparatus further includes a sound source determiner that determines whether the sound source of sound generation subject specified by the sound source specifier has the same identifier as that of the sound source of sound generation subject specified by the sound source specifier in an immediately previous processing period. The sound generation processor continuously executes sound generation processing based on the sound data corresponding to the specified sound source of sound generation subject, in a case where it is deter mined by the sound source determiner that the sound source of sound generation subject specified by the sound source specifier has the same identifier as that of the sound source of sound generation subject specified by the sound source specifier in the immediately previous processing period.

Even though the sound sources having the same identifiers are placed at the different positions, sounds generated from these sound sources are regarded as one sound. For this reason, the problem of the interruption of the sound generation of the joints generated in a case where the plural sound sources with the simple shapes are simply placed, is resolved. For example, if the plural sound sources with the simple shapes that generate sounds of birds are placed in the virtual space and these sound sources are regarded as different sound sources, the positions where the sounds are received are changed by an operation of a user, the sounds of the birds are interrupted midway and the same sounds of the birds start to be newly generated, which is unnatural. In a case where sounds are generated from the sound source having the same identifier as that of the sound source corresponding to the sound generation subject in the immediately previous period (immediately previous frame), sound generation processing is continuously executed based on sound data generated midway, and the interruption problem can be resolved.

Preferably, the sound generation processing apparatus further includes an object mover that moves an object in a virtual space in accordance with an operation of a user on an input device. The sound source specifier further includes a priority specifier that specifies a priority for each sound source, based on a distance between each sound source and the object, and specifies the sound source, which has a higher priority specified by the priority specifier, as the sound source of sound generation subject.

For example, in the game apparatus, the player can move the position of the player character (object) in the virtual space through an operation on the input device. However, since the sound source to execute sound generation processing can be specified in accordance with the position of the player character receiving the sound, the processing load can be reduced as compared with the case where the sound generation processing is executed based on the sound sources with the complicated shapes.

Preferably, the sound generation processing apparatus further includes an object mover that moves an object in a virtual space in accordance with an operation of a user on an input device. The sound source specifier further includes a priority specifier that specifies a priority for each sound source, based on whether an obstacle exists between each sound source and the object, and specifies the sound source, which has a higher priority specified by the priority specifier, as the sound source of sound generation subject.

For example, in the game apparatus, an obstacle may exist between the position of the player character and the sound source. However, since the sound source that is subjected to the sound generation processing is specified in consideration of the obstacle, the sound generation processing can be executed such that the realistic word is maximally implemented.

Preferably, the sound generation processing apparatus further includes an object mover that moves an object in a virtual space in accordance with an operation of a user on an input device. The sound generation processing apparatus also includes a distance measurer that measures a distance between the object moved by the object mover and the sound source of sound generation subject specified by the sound source specifier. The sound generation processor controls an output sound volume in accordance with the distance measured by the distance measurer and executes the sound generation processing.

By using this configuration, since the output sound volume is controlled in accordance with the distance between the object operated by the user and the sound source, the sound volume output by the movement of the object is changed, and the realistic sensation is given to the movement in the virtual space.

According to a second embodiment of the present invention, there is provided a sound generation processing method that executes sound generation processing based on sound sources placed in a virtual space, in a computer, the sound sources being a plurality of sound sources with simple shapes and having the same identifiers or different identifiers. The sound generation processing method includes storing sound data in associate with the identifiers of the sound sources. The sound generation processing method also includes specifying the sound source having a higher priority among the sound sources having the same identifiers as sound source of sound generation subject, based on a predetermined criterion. The sound generation processing method also includes executing sound generation processing in accordance with the sound data corresponding to the specified sound source of sound generation subject.

According to a third embodiment of the present invention, there is provided a recording medium on which recorded is a sound generation processing program that executes sound generation processing based on sound sources placed in a virtual space, in a computer, the sound sources being a plurality of sound sources with simple shapes and having the same identifiers or different identifiers. The sound generation processing program includes a sound source information storing code segment that, when executed, stores sound data in associate with the identifiers of the sound sources. The sound generation processing program also includes a sound source specifying code segment that, when executed, specifies the sound source having a higher priority among the sound sources having the same identifiers as sound source of sound generation subject, based on a predetermined criterion. The sound generation processing program also includes a sound generation processing code segment that, when executed, executes sound generation processing in accordance with the sound data corresponding to the sound source of sound generation subject specified by the sound source specifying code segment.

DESCRIPTION OF THE PREFERRED EMBODIMENTS

Figure 1:
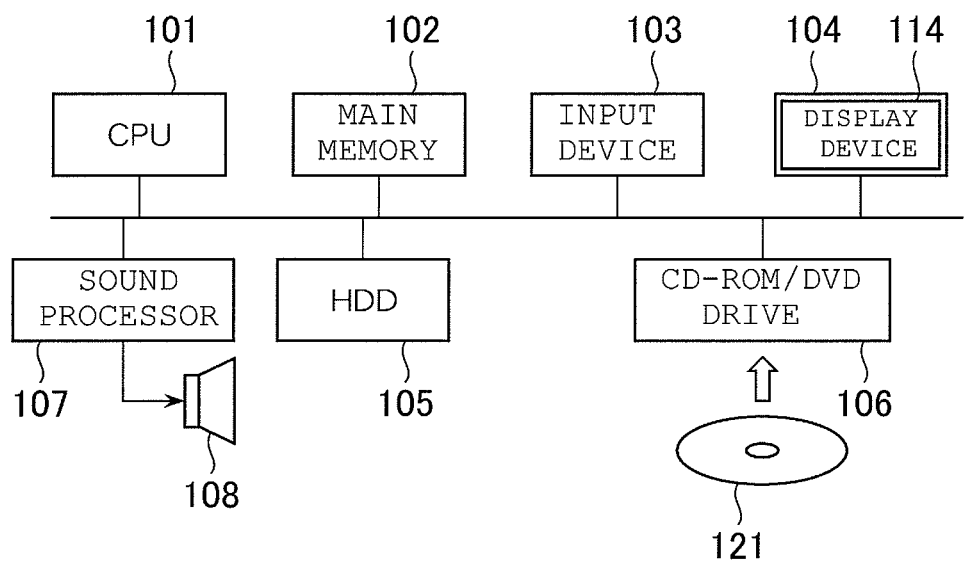
FIG. 1 is a block diagram illustrating the configuration of a game apparatus according to an embodiment of the present invention.

Hereinafter, an embodiment of the present invention will be described with reference to the accompanying drawings. FIG. 1 is a block diagram illustrating the configuration of a game apparatus according to an embodiment of the present invention. The game apparatus shown in FIG. 1 includes a central processing unit (CPU) 101, a main memory 102, an input device 103, a display device 104, a hard disk drive (HDD) 105, and a CD-ROM/DVD drive 106. The display device 104 includes a display screen 114 and a recording medium 121 can be mounted in the CD-ROM/DVD drive 106.

The CPU 101 executes a program stored in the HDD 105 or the recording medium 121 and controls an apparatus body. The main memory 102 is a work area of the CPU 101. Since the HDD 105 is used as a storage area to store a program or data, image data or sound data is stored in the HDD 105.

The CD-ROM/DVD drive 106 reads a program and data from the recording medium 121. The input device 103 includes a directional key and a button. A mouse used as a pointing device and a keyboard that includes a directional key may be used as the input device 103. Input data from the input device 103 is output to the main memory 102 and the CPU 101 analyzes the input data and executes an operation process.

The program and the data executed in the game apparatus according to the embodiment of the present invention are stored in the HDD 105 or the storage medium 121. The program and the data stored in the storage medium 121 are read by the CD-ROM/DVD drive 106 when executed, and are loaded to the main memory 102. The CPU 101 processes the program and the data loaded to the main memory 102 and outputs a drawing command to the display device 104. Intermediate data during the processing based on the CPU 101 is stored in the main memory 102.

The CPU 101 develops image data and displays the image data as an image on the display screen 114 of the display device 104. One frame period of the image output from the CPU 101 is, for example, 1/60 second. The image data is generated by perspectively transforming a three-dimensional virtual space on a virtual screen with a virtual camera as a point of view, and is displayed on the display screen 114.

The CPU 101 reads data needed for an ongoing game from the main memory 102 and processes the data. Since the CPU 101 has a storage capacity smaller than that of the HDD 105, only needed data is loaded to the main memory 102 in accordance with a progress situation of the game.

The CPU 101 processes the program and the data loaded to the main memory 102 and outputs an instruction of a sound output to a sound processor 107. The sound processor 107 is connected to a sound output device 108 serving as a speaker. If the CPU 101 outputs the instruction of the sound output to the sound processor 107, the sound processor 107 outputs a sound signal to the sound output device 108. The sound processor 107 includes a D/A converter, an amplifier and the like.

Figure 2:
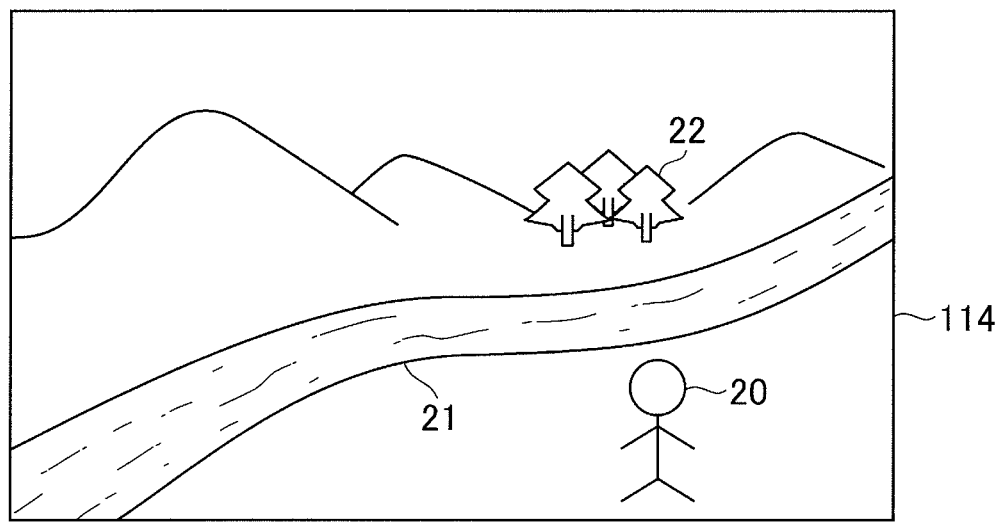
FIG. 2 is a diagram illustrating an example of a display screen of the game apparatus according to the embodiment of the present invention.
Figures 3, 4:
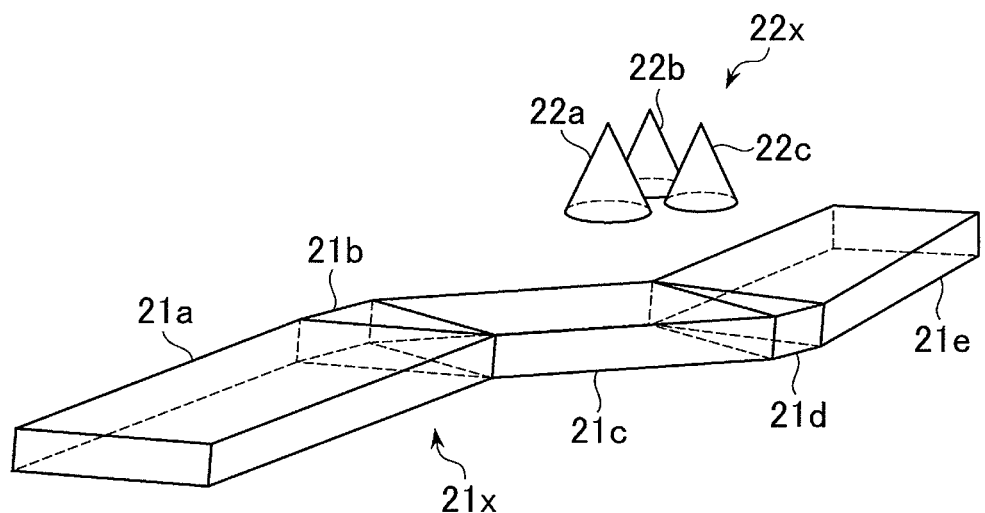
FIG. 3 is a diagram illustrating sound source objects that are placed in a three-dimensional virtual space.
FIG. 4 is a diagram illustrating a sound source table according to the embodiment of the present invention.

FIG. 2 illustrates an example of a display screen of the game apparatus according to the embodiment of the present invention. FIG. 3 illustrates sound source objects placed in a three-dimensional virtual space displayed by the example of the display screen of FIG. 2. Displayed on the display screen 114 are a player character 20 that is operated by the player on the input device 103 and a river 21 that crosses the display screen 114 while meandering at the upper side of the player character, and trees 22 are displayed at the upper side of the river 21. As a sound source object that corresponds to the river 21, a sound source object 21x with a complicated shape that includes sound source objects 21a, 21c, and 21e with shapes of rectangular parallelepipeds and sound source objects 21b and 21d with shapes of triangular prisms is placed, as shown in FIG. 3. The sound source objects 21a to 21e have the same identification numbers and have sound data related to a babbling sound of the river. Likewise, as a sound source object that corresponds to the trees 22, a sound source object 22x with a complicated shape that includes sound source objects 22a, 22b, and 22c with shapes of circular cones is placed. The sound source objects 22a to 22c have the same identification numbers and have sound data related to sounds of birds.

Among the sound source objects that constitute the sound source object 21x with the complicated shape, the sound source object 21c is the closest to the player character 20. For this reason, when a sound source of sound generation subject which is subjected to sound generation processing is specified, the sound source object 21c has the highest priority. Accordingly, the sound generation processing is executed based on the sound source object 21c. If the player character moves to the left side, the sound source object that has the highest priority is sequentially changed from the sound source object 21c to the sound source object 21b and then to the sound source object 21a. However, since the sound sources having the same identification numbers are handled as one sound source, the sound is reproduced without making the sound interrupted halfway.

As the sound source object with the simple shape that is used in the present invention, a sound source object with any shape selected from shapes of a cube, a rectangular parallelepiped, a cylinder, a circular cone, a prismatic column, a pyramid, a partial sphere, and a sphere is exemplified. However, a sound source object that has a shape other than the above shapes may be used. If the plural sound source objects are combined, a sound source object with a complicated shape is generated. The sound source object with the complicated shape is placed in accordance with the configuration of the land or the area of the three-dimensional virtual space and graphic data. Accordingly, in a case where the babbling sound of the river needs to be output as a sound, a sound source object that has sound data on the babbling sound of the river is placed in accordance with a shape of the river on the three-dimensional virtual space.

In this case, bottoms of the cylinder and the circular cone may not be a true circle and may be an ellipse. Bottoms of the prismatic column and the pyramid may be a polygon, such as a triangle and a rectangle. The sphere may not be a true sphere and is a concept that includes an elliptical sphere. The partial sphere is a concept that includes a solid obtained by dividing the true sphere or the elliptical sphere at an arbitrary section.

Sizes and ratios of the lengths of the sound sources with the simple shapes can be arbitrarily set. Accordingly, the sizes and the ratios of the lengths of the sound sources with the simple shapes that become components of the sound source with the complicated shape may be different between the sound sources having the same identification numbers. Thus, even in the sound sources of the rectangular parallelepipeds that have the same identification numbers, the sizes and the ratios of the lengths of the sides constituting the rectangular parallelepipeds can be arbitrarily set. Likewise, even in the sound sources of the cylinder and the circular cone, ratios of the lengths of the diameters of the bottom surfaces and the heights can be arbitrarily set. With respect to the sound sources with different shapes, such as the sound source with the shape of the rectangular parallelepiped and the sound source with the shape of the sphere, the same identification numbers can be assigned.

The identification numbers are assigned to these sound sources, respectively. For example, in a case where the sound sources are managed as components of one sound source with a complicated shape such as a river, which is the sound source to express the babbling sound of the river, the same identification numbers are assigned. In a case where the plural rivers exist in the three-dimensional virtual space, the sound sources may not be regarded as the components of one sound source with the complicated shape even in the babbling sound of the same river. Therefore, different identification numbers can be assigned. In the case of the sound sources that have the same identification numbers, since the sound generation processing is executed preferentially from the sound sources having the higher priority, the problem of interruption of the sound that would be generated in the case where the plural sound sources with simple shapes are simply placed is resolved. The sound sources where the identification numbers are not assigned or the sound sources that have the different identification numbers are each regarded as a single sound source.

Next, a sound source table that is set to the main memory 102 will be described. FIG. 4 illustrates the sound source table according to the embodiment of the present invention. Referring to FIG. 4, in a sound source table 30, identification numbers 32 of sound source objects that can be placed in a three-dimensional virtual space, sound data 33 generated by the sound source objects, and reference sound volumes $V_0$ 34 of the sound data 33 generated are stored. The sound generation processing by the sound processor 107 is executed by referring to the sound data 33 and the reference sound volumes $V_0$ 34 stored in the sound source table 30.

The generated output sound volume changes in accordance with the distance between the position of the player character corresponding to a sound receiving point and the sound source. For example, the output sound volume can be set small to be inversely proportional to a square of the distance. That is, the output sound volume V is represented by the following Equation 1.

[Equation 1]

$$V = V_0 \times 1/(r/r_0)^2 \quad (1)$$

In this case, the reference sound volume $V_0$ means the reference output sound volume of when the distance between the player character and the sound source is the reference distance $r_0$, and $V_0$ and $r_0$ are values that are previously set for each sound source. Accordingly, if the distance r between the player character and the sound source is determined, the output sound volume V is also specified. In a case where an obstacle exists between the sound source of the sound generation subject and the player character, the right side of Equation 1 is multiplied by a later-mentioned attenuation rate D of the output sound volume based on the obstacle, whereby the output sound volume is determined.

Figure 5:
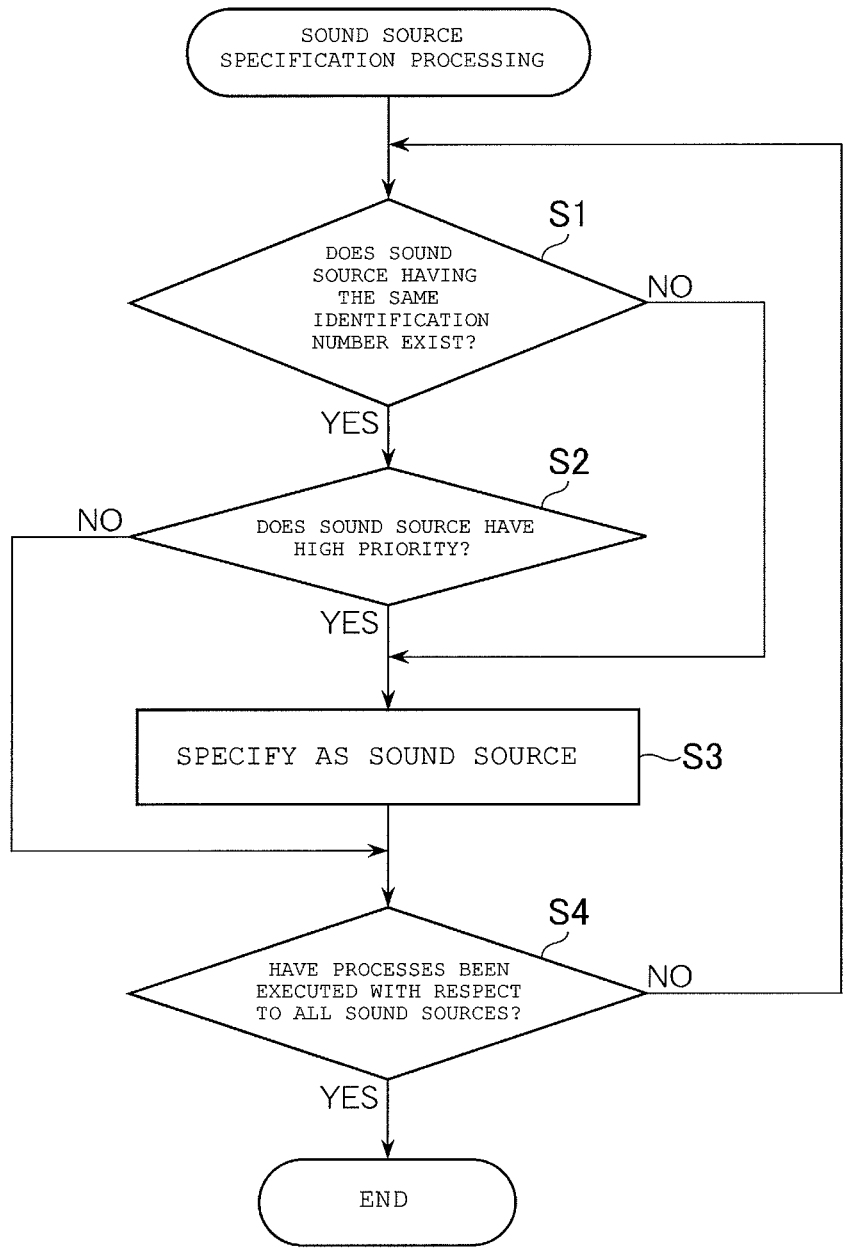
FIG. 5 is a flowchart illustrating a flow of when sound source specification processing of sound generation subject according to the embodiment of the present invention is executed.
Figures 6, 7:
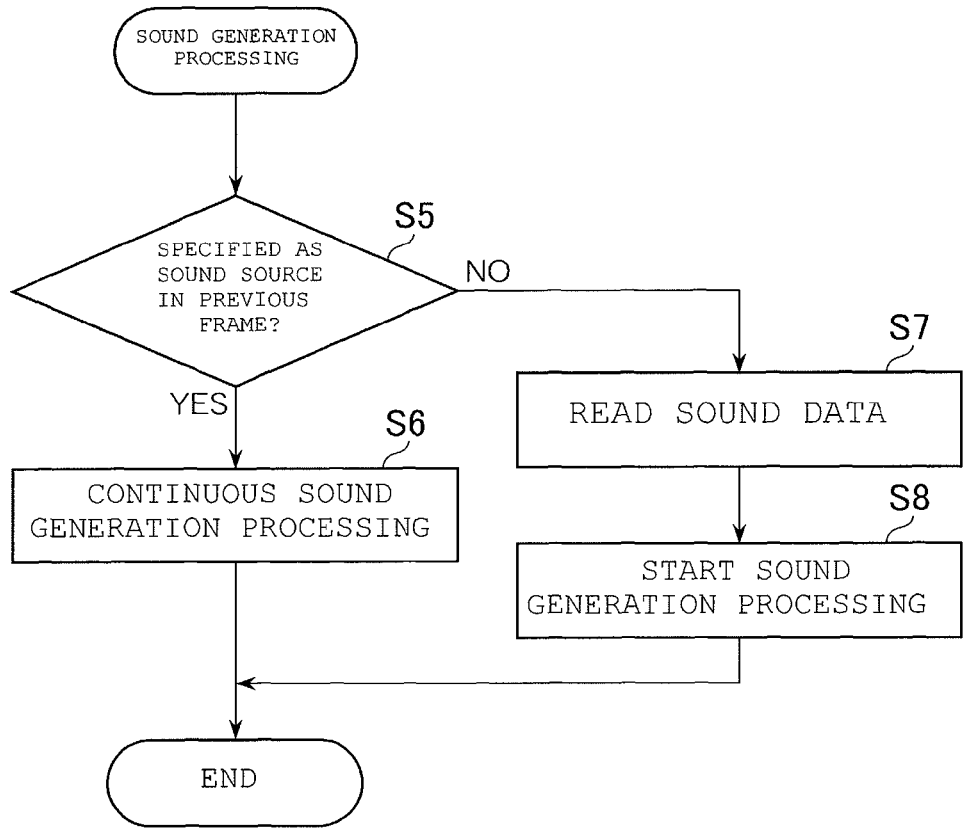
FIG. 6 is a diagram illustrating a sound source table of sound generation subject according to the embodiment of the present invention.
FIG. 7 is a flowchart illustrating a flow of when sound generation processing according to the embodiment of the present invention is executed.

Next, sound source specification processing will be described. FIG. 5 is a flowchart illustrating a flow of when sound source specification processing according to the embodiment of the present invention is executed. In this case, the processes of steps S1 to S3 are executed with respect to all the sound sources corresponding to subjects of the sound sources that generate sounds. The sound sources corresponding to the subjects of the sound generation can be defined as only the sound sources placed in a predetermined range (for example, specific area) of a virtual space where the player character exists or a range of the predetermined distance from the player character. FIG. 6 illustrates a sound source table of sound generation subject 31 according to the embodiment of the present invention. The sound source table of sound generation subject 31 is set to the main memory 102. In the sound source table of sound generation subject 31, identification numbers 32 of sound sources that are specified as the sound source of sound generation subject and position information 35 of the sound sources are stored in an orthogonal coordinate system, in step S3.

First, it is determined whether the sound source of sound generation subject having the same identification number as that of the sound source becoming the processing subject exists in the sound source table of sound generation subject 31 (step S1). In a case where it is determined that the sound source of sound generation subject having the same identification number does not exist (step S1: NO), the sound source becoming the processing subject is specified as the sound source of sound generation subject (step S3), and is stored in the sound source table of sound generation subject 31.

Meanwhile, in a case where it is determined that the sound sources of sound generation subject having the same identification number exists (YES in step S1), it is determined whether the priority of the sound source as the sound source of sound generation subject is higher than the priority of the sound source as the processing subject. In a case where it is determined that the priority of the sound source as the processing subject is higher than the priority of the sound source of sound generation subject (YES in step S2), the sound source as the processing subject is specified as the sound source of sound generation subject (step S3), and the sound source table of sound generation subject 31 is updated. In a case where it is determined that the priority of the sound source as the processing subject is lower than the priority of the sound source of sound generation subject (NO in step S2), the sound source of sound generation subject is used without a change.

If the process of step S3 ends, it is determined whether the processes of steps S1 to S3 are executed with respect to all the sound sources that may become the sound sources of sound generation subject (step S4). In a case where it is determined that the processes of steps S1 to S3 are not executed with respect to all the sound sources (NO in step S4), the processes of step S1 to S3 are repetitively executed with respect to the sound sources to which the processes are not executed. In a case where it is determined that the processes of steps S1 to S3 are executed with respect to all the sound sources (YES in step S4), a series of processes ends. The series of processes of steps S1 to S4 is executed for each frame and the sound source of sound generation subject is specified for each frame.

As the reference for determining the priority, if the distance between the sound source and the player character decreases, the priority becomes high. That is, in the case of the sound sources that have the same identification numbers, the sound source that is the closest to the position of the player character corresponding to the sound receiving point can be set as the sound source of sound generation subject. In a case where the obstacle does not exist between the sound source and the player character, the sound source can have a higher priority. For example, in a case where the distance between a sound source A and the player character is $r_A$ and the distance between a sound source B and the player character is $r_B$, it is determined whether the obstacle exists between the position of each sound source and the position of the player character corresponding to the sound receiving point. In a case where the obstacle exists between the sound source A and the player character but the obstacle does not exist between the sound source B and the player character, for example, $r_A^2$/(attenuation rate D of the output sound volume based on the obstacle) and $r_B^2$ are compared with each other, and the sound source corresponding to the small value is specified as the sound source of sound generation subject. The attenuation rate D of the output sound volume based on the obstacle has a value of 0 to 1. The attenuation rate D can be appropriately changed in accordance with the kind of the obstacle.

Next, sound generation processing will be described. FIG. 7 is flowchart illustrating a flow of when sound generation processing according to the embodiment of the present invention is executed. First, it is determined whether the sound source specified as the sound source of sound generation subject in step S4 is specified as the sound source of sound generation subject in an immediately previous frame (step S5). In the main memory 102, the identification number of the sound source of sound generation subject that has become the subject of the sound generation processing in the immediately previous frame is stored. The determination in step S5 is executed based on the identification number.

In a case where it is determined that the sound source specified as the sound source of sound generation subject is specified as the sound source of sound generation subject in the immediately previous frame (YES in step S5), the sound generation processing is continuously executed (step S6). In a case where the sound sources with simple shapes are simply combined, the player character moves and the position changes. As a result, the sound is interrupted midway and the same sound data is newly reproduced, which is unnatural. In a case where the sounds are generated from the sound source having the same identification number as the sound source of sound generation subject in the immediately previous frame, the sound generation processing is continuously executed based on the sound data generated midway, and the interruption problem can be resolved.

Meanwhile, in a case where it is determined that the sound source is not specified as the sound source of sound generation subject in the immediately previous frame (NO in step S5), the sound data 33 that is stored in the sound source table 30 is read (step S7) and the sound generation processing starts based on the sound data 33 (step S8).

In the embodiment described above, the present invention has been described on the assumption of the use in the game apparatus. The sound generation processing apparatus according to the present invention is not limited to the game apparatus and can be used for another purpose, as long as the sound sources are placed in a virtual space and the sound receiving position can be moved by the user.

101 CPU
102 main memory
103 input device
104 display device
105 HDD
106 CD-ROM/DVD drive
107 sound processor
108 sound output device
114 display screen

What is claimed is:

1. A sound generation processing apparatus that executes sound generation processing based on sound generation subjects placed in a virtual space, the sound generation subjects each comprising a plurality of sound source objects that have identifiers, the sound generation processing apparatus comprising:
   a sound source information storage that stores sound data in association with the identifiers of the plurality of sound source objects;
   a sound source specifier that specifies a sound source object having a higher priority among the plurality of sound source objects having a same identifier as a sound source of a sound generation subject, based on a predetermined criterion;
   a sound generation processor that executes sound generation processing in accordance with the sound data corresponding to the sound source of the sound generation subject specified by the sound source specifier; and
   an object mover that moves an object in the virtual space in accordance with an operation of a user on an input device,
   wherein the sound source specifier includes a priority specifier that specifies a priority for each of the plurality of sound source objects having the same identifier based on whether an obstacle exists between each of the plurality of sound source objects having the same identifier and the object, and specifies the sound source object, which has the highest priority, as the sound source of the sound generation subject.

2. The sound generation processing apparatus according to claim 1, further comprising:
   a sound source determiner that determines whether the sound source of the sound generation subject specified by the sound source specifier has the same identifier as a previous sound source of a previous sound generation subject specified by the sound source specifier in an immediately previous processing period,
   wherein the sound generation processor continuously executes the sound generation processing based on previous sound data corresponding to the previous sound source of the previous sound generation subject when it is determined by the sound source determiner that the sound source of the sound generation subject specified by the sound source specifier has the same identifier as the previous sound source of the previous sound generation subject specified by the sound source specifier in the immediately previous processing period.

3. The sound generation processing apparatus according to claim 1,
   wherein the priority specifier further specifies the priority for each of the plurality of sound source objects having the same identifier based on a distance between each of the plurality of sound source objects and the object.

4. The sound generation processing apparatus according to claim 1, further comprising:
   a distance measurer that measures a distance between the object moved by the object mover and the sound source of the sound generation subject specified by the sound source specifier,
   wherein the sound generation processor controls an output sound volume in accordance with the distance measured by the distance measurer.

5. A sound generation processing method that executes sound generation processing based on sound generation subjects placed in a virtual space, in a computer, the sound generation subjects each comprising a plurality of sound source objects that have identifiers, the sound generation processing method comprising:
   storing sound data in association with the identifiers of the plurality of sound source objects;
   specifying a sound source object having a higher priority among the plurality of sound source objects having a same identifier as a sound source of a sound generation subject, based on a predetermined criterion;
   executing sound generation processing in accordance with the sound data corresponding to the specified sound source of the sound generation subject; and
   moving an object in the virtual space in accordance with an operation of a user on an input device,
   wherein a priority for each of the plurality of sound source objects having the same identifier is specified based on whether an obstacle exists between each of the plurality of sound source objects having the same identifier and the object.

6. A tangible recording medium on which a sound generation processing program is recorded that executes sound generation processing based on sound generation subjects placed in a virtual space, in a computer, the sound generation subjects each comprising a plurality of sound source objects that have identifiers, the sound generation processing program comprising:
   a sound source information storing code segment that, when executed, stores sound data in association with the identifiers of the plurality of sound source objects;
   a sound source specifying code segment that, when executed, specifies a sound source object having a higher priority among the plurality of sound source objects having a same identifier as a sound source of a sound generation subject, based on a predetermined criterion; and
   a sound generation processing code segment that, when executed, executes sound generation processing in accordance with the sound data corresponding to the sound source of the sound generation subject specified by the sound source specifying code segment; and an object moving code segment that, when executed, moves an object in the virtual space in accordance with an operation of a user on an input device, wherein the sound source specifying code segment includes a priority specifying code segment that, when executed, specifies a priority for each of the plurality of sound source objects having the same identifier based on whether an obstacle exists between each of the plurality of sound source objects having the same identifier and the object, and specifies the sound source object, which has the highest priority, as the sound source of the sound generation subject.

7. The sound generation processing apparatus according to claim 1, wherein each of the plurality of sound source objects of each of the sound generation subjects has a simple geometric shape.

8. The sound generation processing apparatus according to claim 1, wherein one of sizes and ratios of shapes of the plurality of sound source objects of one of the sound generation subjects are different.

9. The sound generation processing apparatus according to claim 8, wherein the sound generation processing is differently executed for the plurality of sound source objects of the one of the sound generation subjects.

10. The sound generation processing apparatus according to claim 1, wherein the sound source object specified by the sound source specified has a highest priority among the plurality of sound source objects having the same identifier.

11. The sound generation processing apparatus according to claim 1, wherein the priority specifier specifies the priority based on an attenuation rate of an output sound volume of the obstacle.

12. The sound generation processing method according to claim 5, wherein each of the plurality of sound source objects of each of the sound generation subjects has a simple geometric shape.

13. The sound generation processing method according to claim 5, wherein one of sizes and ratios of shapes of the plurality of sound source objects of one of the sound generation subjects are different.

14. The sound generation processing method according to claim 13, wherein the sound generation processing is differently executed for the plurality of sound source objects of the one of the sound generation subjects.

15. The sound generation processing method according to claim 5, wherein the sound source object that is specified has a highest priority among the plurality of sound source objects having the same identifier.

16. The sound generation processing method according to claim 5, wherein the priority is specified based on an attenuation rate of an output sound volume of the obstacle.

17. The tangible recording medium according to claim 6, wherein each of the plurality of sound source objects of each of the sound generation subjects has a simple geometric shape.

18. The tangible recording medium according to claim 6, wherein one of sizes and ratios of shapes of the plurality of sound source objects of one of the sound generation subjects are different.

19. The tangible recording medium according to claim 18, wherein the sound generation processing is differently executed for the plurality of sound source objects of the one of the sound generation subjects.

20. The tangible recording medium according to claim 6, wherein the priority specifying code segment specifies the priority based on an attenuation rate of an output sound volume of the obstacle.

* * * * *